United States Patent
Moon et al.

(10) Patent No.: US 12,262,124 B2
(45) Date of Patent: Mar. 25, 2025

(54) METHOD OF DERIVING COLOR RESPONSE CHARACTERISTICS OF IMAGE ACQUISITION DEVICE AND IMAGE ACQUISITION DEVICE THEREFOR

(71) Applicant: SAMSUNG ELECTRONICS CO., LTD., Suwon-si (KR)

(72) Inventors: Junhyuk Moon, Suwon-si (KR); Hyochul Kim, Suwon-si (KR); Heejin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 101 days.

(21) Appl. No.: 18/107,319

(22) Filed: Feb. 8, 2023

(65) Prior Publication Data

US 2024/0080576 A1 Mar. 7, 2024

(30) Foreign Application Priority Data

Sep. 6, 2022 (KR) .................. 10-2022-0113021

(51) Int. Cl.
*H04N 23/84* (2023.01)
*H04N 25/10* (2023.01)

(52) U.S. Cl.
CPC .......... *H04N 23/841* (2023.01); *H04N 25/10* (2023.01)

(58) Field of Classification Search
CPC .... H04N 23/841; H04N 25/10; H04N 1/6061; H04N 1/6033; H04N 2209/047; H04N 25/135; H04N 17/02; H04N 9/64; G01J 3/2823; G06N 20/00
See application file for complete search history.

(56) References Cited

U.S. PATENT DOCUMENTS

| 2004/0218811 A1 | 11/2004 | Edge et al. |
| 2009/0128867 A1 | 5/2009 | Edge |
| 2011/0026052 A1 | 2/2011 | Edge |
| 2012/0327477 A1 | 12/2012 | Edge |
| 2022/0003906 A1 | 1/2022 | Kim et al. |

FOREIGN PATENT DOCUMENTS

CN 109345457 A 2/2019

OTHER PUBLICATIONS

D. Andrew Rowlands, "Color conversion matrices in digital cameras: a tutorial", Optical-Engineering, Nov. 2020, 36 pages.
(Continued)

*Primary Examiner* — Sinh Tran
*Assistant Examiner* — Angel L Garces-Rivera
(74) *Attorney, Agent, or Firm* — Sughrue Mion, PLLC

(57) ABSTRACT

A method of deriving color response characteristics of an image acquisition device, the method including: collecting first training data sets; deriving a first-order color response characteristic of the image acquisition device by performing a matching operation of statistically matching a relationship between device coordinates and colorimetric coordinates of an image acquisition device using the first training data sets; collecting second training data sets corresponding to a spectrum of one or more edge regions of a color gamut of a color matching function representing a sensitivity of a human eye; and deriving a second-order color response characteristic of the image acquisition device by further performing the matching operation using the second training data sets.

19 Claims, 8 Drawing Sheets

(56) References Cited

OTHER PUBLICATIONS

Communication issued on Sep. 29, 2023 by the Korean Intellectual Property Office in Korean Patent Application No. 10-2022-0113021.

Ma et al., "Colorimetric Characterization of digital camera based on RBF neural network", Proceedings of SPIE, 2020, vol. 11550, No. 1155019, doi:10.1117/12.2574973, pp. 1-7 (8 pages total).

Ye et al., "Camera characterization using back-propagation artificial neutral network based on Munsell system", Proc. of SPIE, 2008, vol. 6621, No. 66210A, doi: 10 1117/12 790592, pp. 1-7 (7 pages total).

Fairchild, "Color Appearance Models", 3rd edition, pp. 350-352 (3 pages total).

Nyström, "Colorimetric and Multispectral Image Acquisition", Linköping Studies in Science and Technology, Licentiate Thesis No. 1289, 2006, pp. 1-138 (150 pages total).

Bianco et al., "Empirical modeling for colorimetric characterization of digital cameras", 2009 16th IEEE International Conference on Image Processing (ICIP), DOI: 10.1109/ICIP.7009.S413878, pp. 3469-3472 (5 pages total).

Khan et al., "Color characterization methods for a multispectral camera", Electronic Imaging, 2018 (9 pages total).

FIG. 4

| 1 | 2 | 3 | 4 |
|---|---|---|---|
| 5 | 6 | 7 | 8 |
| 9 | 10 | 11 | 12 |
| 13 | 14 | 15 | 16 |

METHOD OF DERIVING COLOR RESPONSE CHARACTERISTICS OF IMAGE ACQUISITION DEVICE AND IMAGE ACQUISITION DEVICE THEREFOR

CROSS-REFERENCE TO RELATED APPLICATION

This application is based on and claims priority under 35 U.S.C. § 119 to Korean Patent Application No. 10-2022-0113021, filed on Sep. 6, 2022, in the Korean Intellectual Property Office, the disclosure of which is incorporated by reference herein in its entirety.

BACKGROUND

1. Field

One or more example embodiments of the disclosure relate to a method of deriving color response characteristics of an image acquisition device and an image acquisition device therefor.

2. Description of the Related Art

In general, because an image acquisition device acquires and expresses an image differently depending on the model and manufacturing company, even if the same scene is captured with image acquisition devices of the same model, colors are expressed differently. In particular, because each image acquisition device reproduces characteristic colors by using a unique image processor, an actual color recognized by the eyes is different from the color expressed by the image acquisition device. Accordingly, in order to accurately acquire and reproduce a color to be perceived by the human eyes, an image acquisition device characterization process is required.

SUMMARY

One or more example embodiments provide a method of effectively deriving color response characteristics of an image acquisition device and an image acquisition device therefor.

Additional aspects will be set forth in part in the description which follows and, in part, will be apparent from the description, or may be learned by practice of the presented embodiments of the disclosure.

According to an aspect of an example embodiment of the disclosure, a method of deriving color response characteristics of an image acquisition device is provided, including: collecting first training data sets; deriving a first-order color response characteristic of the image acquisition device by performing a matching operation of statistically matching a relationship between device coordinates and colorimetric coordinates of an image acquisition device using the first training data sets; collecting second training data sets corresponding to a spectrum of one or more edge regions of a color gamut of a color matching function representing a sensitivity of a human eye; and deriving a second-order color response characteristic of the image acquisition device by further performing the matching operation using the second training data sets.

According to an aspect of an example embodiment of the disclosure, an image acquisition device is provided, including: a multi-spectral image sensor including a plurality of pixels that are two-dimensionally arranged, the multi-spectral image sensor configured to acquire an image using the plurality of pixels; and a processor configured to: derive a first-order color response characteristic of the image acquisition device by performing a matching operation of statistically matching a relationship between device coordinates and colorimetric coordinates of an image acquisition device using first training data sets; derive a second-order color response characteristic of the image acquisition device by further performing the matching operation using second training data sets, the second training data sets corresponding to a spectrum of one or more edge regions of a color gamut of a color matching function representing a sensitivity of a human eye; and process the image acquired by the multi-spectral image sensor by using the first-order color response characteristic and the second-order color response characteristic.

According to an aspect of an example embodiment of the disclosure, a non-transitory recording medium including a computer readable program in which a program for implementing a method of operation performed by an electronic device is recorded, the method including: collecting first training data sets; deriving a first-order color response characteristic of the image acquisition device by performing a matching operation of statistically matching a relationship between device coordinates and colorimetric coordinates of an image acquisition device using the first training data sets; collecting second training data sets corresponding to a spectrum of one or more edge regions of a color gamut of a color matching function representing a sensitivity of a human eye; and deriving a second-order color response characteristic of the image acquisition device by further performing the matching operation using the second training data sets.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 shows an example of one pixel of FIG. 3;

DETAILED DESCRIPTION

Figure 1:
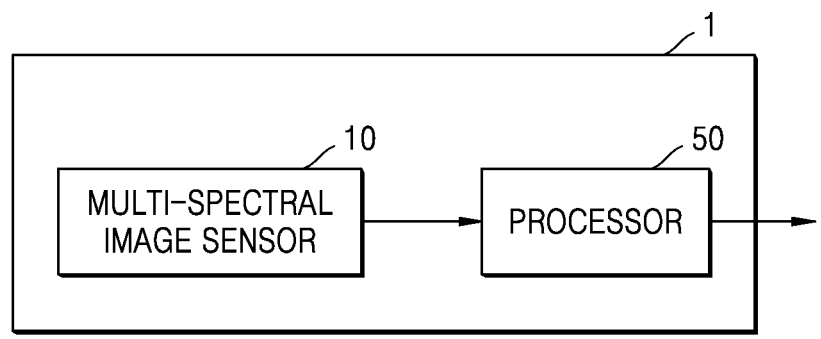
FIG. 1 is a schematic block diagram of an image acquisition device according to an example embodiment.

Reference will now be made in detail to some embodiments, examples of which are illustrated in the accompanying drawings, wherein like reference numerals refer to like elements throughout. In this regard, the present embodiments may have different forms and should not be construed as being limited to the descriptions set forth herein. The embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereafter, the embodiments will be described more fully with reference to the accompanying drawings. In the following drawings, like reference numerals refer to the like components, and the size of each component may be exaggerated for clarity and convenience of description. The embodiments of the disclosure are capable of various modifications and may be embodied in many different forms.

It will be understood that when an element or layer is referred to as being "on" or "above" another element or layer, the element or layer may be directly on another element or layer or intervening elements or layers. The singular forms include the plural forms unless the context clearly indicates otherwise. In addition, when a part "comprises" or "includes" an element in the specification, unless otherwise defined, it is not excluding other elements but may further include other elements.

The term "above" and similar directional terms may be applied to both singular and plural. With respect to operations that constitute a method, the operations may be performed in any appropriate sequence unless the sequence of operations is clearly described or unless the context clearly indicates otherwise, and the operations may not necessarily be performed in the order of sequence.

Also, in the specification, the term "units" or " . . . modules" denote units or modules that process at least one function or operation, and may be realized by hardware, software, or a combination of hardware and software.

Connections or connection members of lines between components shown in the drawings illustrate functional connections and/or physical or circuit connections, and the connections or connection members can be represented by replaceable or additional various functional connections, physical connections, or circuit connections in an actual apparatus.

All examples or example terms are simply used to explain in detail the technical scope of the inventive concept, and thus, the scope of the inventive concept is not limited by the examples or the example terms as long as it is not defined by the claims.

A multi-spectral imaging technique is a technique for simultaneously measuring an image of an object and a continuous light spectrum for each point in the image. The multi-spectral imaging technology may measure a light spectrum of each part of an object in a short time compared to spot spectroscopy of the related art.

In the multi-spectral imaging technique, traditionally, an image and spectrum are acquired at the same time by dispersing light that has passed through a narrow aperture with a grating like a point-scan method (i.e., whisker-broom method) or a line scan method (i.e., a push-broom method), etc. Recently, a snapshot method in which an image for each wavelength band is simultaneously captured by combining a bandpass filter array or a tunable filter on an image sensor has also been introduced.

Because each pixel in an image acquired by an image acquisition device that implements the multi-spectral imaging technology includes spectral information, various applications are possible for measuring the properties and characteristics of an object by remotely capturing an image. For example, the multi-spectral imaging technology may be applied to analysis of agricultural site conditions, a mineral distribution, a surface vegetation, a pollution level, etc. by taking ground imaging from drones and satellites, aircraft, etc., and the applications are being considered in various fields, such as food safety, skin/face analysis, authentication recognition, biometric tissue analysis, etc.

In addition, the multi-spectral imaging technique may be employed in various high-performance optical devices or high-performance electronic devices. Such electronic devices may include, for example, smart phones, mobile phones, cell phones, personal digital assistants (PDA), laptops, PCs, various portable devices, home appliances, security cameras, medical cameras, automobiles, and Internet of Things (IoT) or other mobile or non-mobile computing devices, but is not limited thereto.

FIG. 1 is a schematic block diagram showing an image acquisition device 1 according to an example embodiment.

Referring to FIG. 1, the image acquisition device 1 according to an example embodiment is provided to acquire an image using a multi-spectral imaging technique. The image acquisition device 1 includes a multi-spectral image sensor 10 and a processor 50 for processing images acquired by the multi-spectral image sensor 10. The processor 50 may extract a spectrum of each pixel of an image obtained by the multi-spectral image sensor 10 and correct the spectrum by normalizing the spectrum of each pixel.

Figure 2:
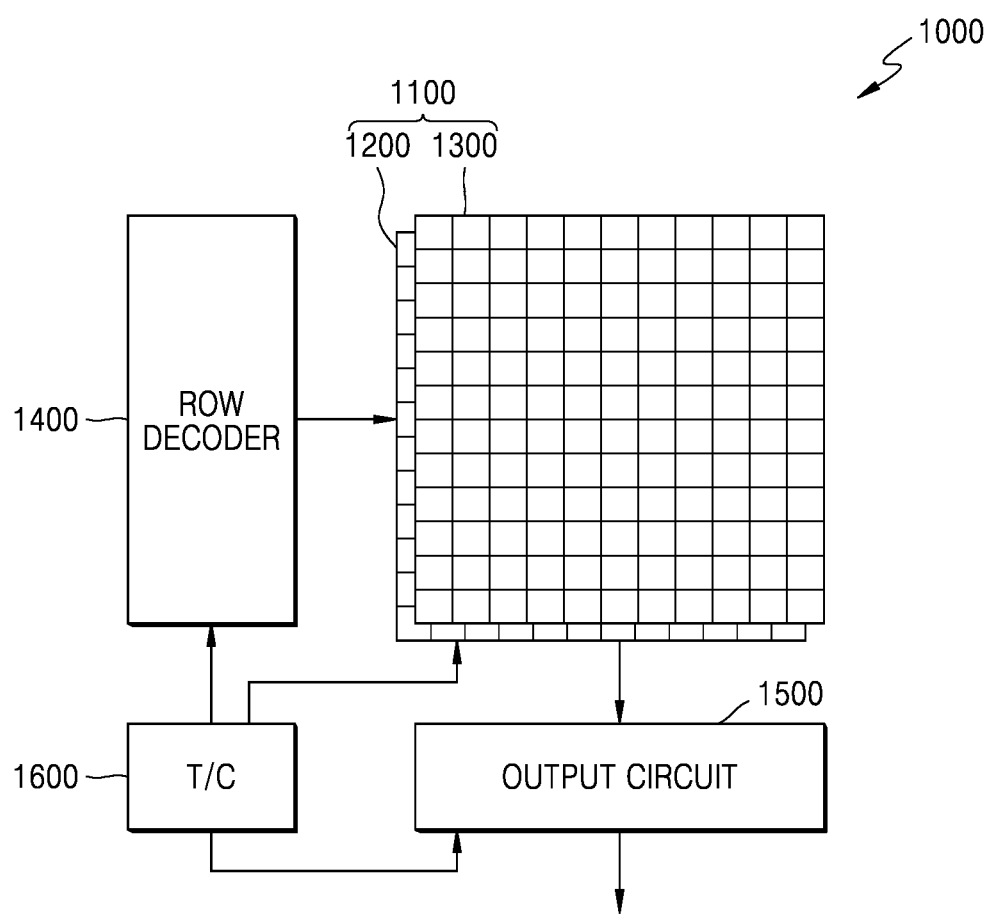
FIG. 2 a diagram showing a multi-spectral image sensor applicable to an image acquisition device according to an example embodiment.

FIG. 2 a diagram showing a multi-spectral image sensor applicable to an image acquisition device 1000 according to an embodiment. The multi-spectral image sensor 1000 shown in FIG. 2 may be applied to the image acquisition device 1 of FIG. 1, and may be applied to image acquisition devices 100, 200, and 300 according to other example embodiments to be described later and electronic devices to which the multi-spectral image sensor 1000 is applied.

Referring to FIG. 2, the multi-spectral image sensor 1000 may include a pixel array 1100, a timing controller 1600, a row decoder 1400, and an output circuit 1500.

The pixel array 1100 of the multi-spectral image sensor 1000 includes a plurality of two-dimensionally arranged pixels and a plurality of sub-pixels arranged in an n×n (n is an integer of 3 or more) array so that each pixel senses light of bands having different central wavelengths.

The pixel array 1100 may include, for example, a combination of a sensing unit 1200 and a spectral filter 1300. Although FIG. 2 shows that the sensing unit 1200 and the spectral filter 1300 included in the pixel array 1100 are separated from each other, the embodiment is not limited thereto. In the pixel array 1100, for example, the sensing unit 1200 and the spectral filter 1300 may be integrally provided in a stacked structure. In the sensing unit 1200, a sensing region may be formed to correspond to a pixel and an arrangement of sub-pixels (or a sub-pixel arrangement) of the pixel array 1100. The spectral filter 1300 may have a two-dimensional arrangement of filter regions to correspond to the sub-pixel arrangement of each pixel provided to transmit light in regions having different central wavelengths.

The row decoder 1400 selects one or more of rows of the pixel array 1100 in response to a row address signal output from the timing controller 1600. The output circuit 1500 outputs a photo-sensing signal from a plurality of pixels arranged along a selected row in a column-by-column unit. To this end, the output circuit 1500 may include a column decoder, an analog-to-digital converter (ADC), and the like.

For example, the output circuit 1500 may include a plurality of ADCs respectively disposed in each column between the column decoder and the pixel array 1100, or one ADC disposed at an output terminal of the column decoder. The timing controller 1600, the row decoder 1400, and the output circuit 1500 may be implemented as a single chip or as separate chips. The processor 50 for processing an image signal output through the output circuit 1500 may be implemented as a single chip together with the timing controller 1600, the row decoder 1400, and the output circuit 1500. Each pixel of the pixel array 1100 includes a plurality of sub-pixels that sense light having different central wavelength regions, and the arrangement of the sub-pixels may be implemented in various ways. The processor 50 may perform a method of deriving color response characteristics of an image acquisition device according to an example embodiment, which will be described in detail below.

Figure 3:
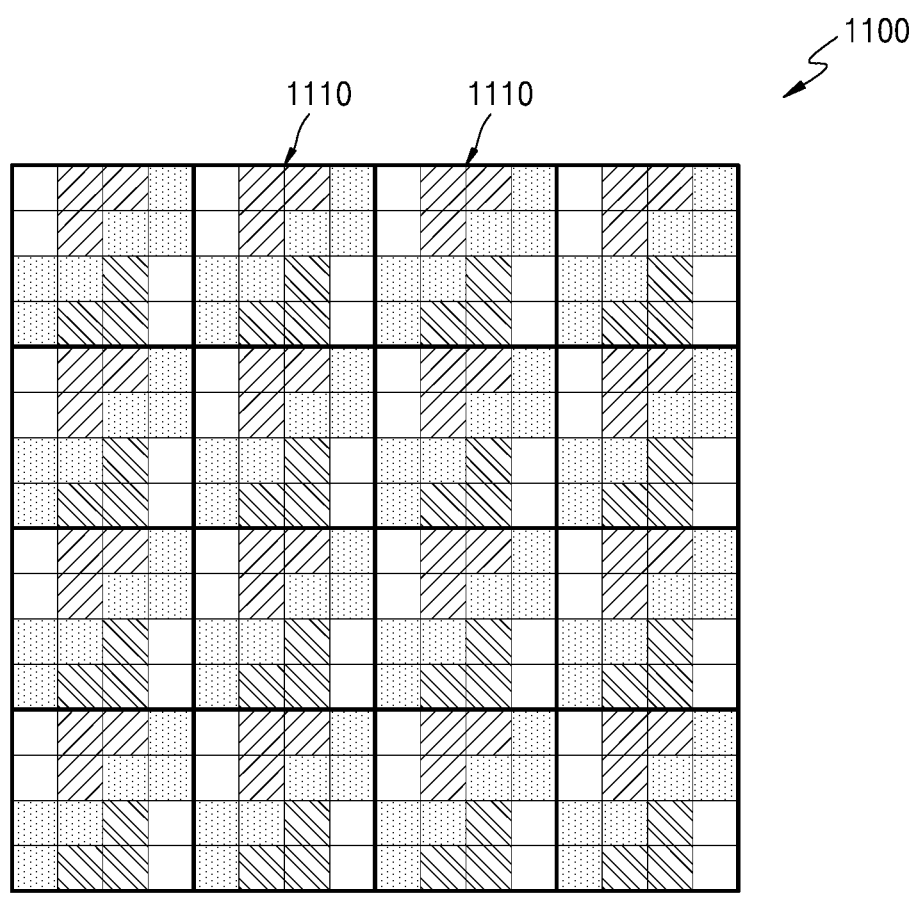
FIG. 3 is a diagram showing a pixel array of a multi-spectral image sensor according to an example embodiment.

FIG. 3 is a diagram showing the pixel array 1100 of the multi-spectral image sensor 1000 according to an example embodiment.

Referring to FIG. 3, the pixel array 1100 of the multi-spectral image sensor 1000 includes a plurality of pixels that are two-dimensionally arranged, and a plurality of sub-pixels arranged in an n×n (n is an integer greater than or equal to 3) array form so that each pixel senses light of a band having a different central wavelength.

For example, the pixel array 1100 of the multi-spectral image sensor 1000 may include a plurality of blue sub-pixels in which light of a blue light region having different central wavelengths is sensed, a plurality of green sub-pixels in which light of a green light region having different central wavelengths is sensed, a plurality of red sub-pixels in which light of a red light region having different central wavelengths is sensed, one or more near-infrared sub-pixels in which near-infrared light is sensed, and one or more ultraviolet sub-pixels in which ultraviolet light is sensed.

Each pixel of the multi-spectral image sensor 1000 includes a plurality of sub-pixels to sense light in regions having different central wavelengths, and the plurality of sub-pixels, for example, may be arranged in a 3×3, 4×4, or 5×5 array form. FIG. 3 shows an example of a pixel array in which sub-pixels of each pixel are arranged in a 4×4 array.

Figure 4:
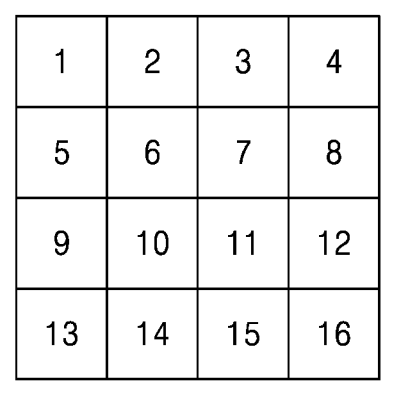
Figure 5:
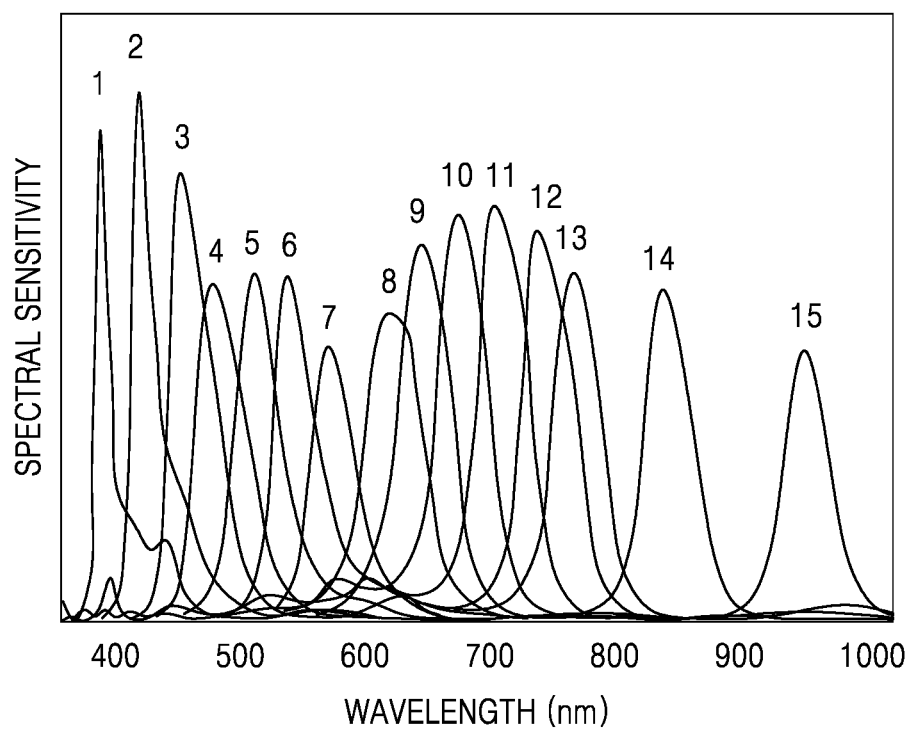
FIG. 5 is a graph showing spectral sensitivity according to a wavelength of each sub-pixel of FIG. 4.

FIG. 4 shows an example of one pixel of FIG. 3, and FIG. 5 shows spectral sensitivity according to a wavelength of each sub-pixel of FIG. 4. In FIG. 4, reference numerals 1, 2, . . . , 15, and 16 each denote sub-pixels s1, s2, . . . , s15, and s16.

As shown in FIGS. 4 and 5 as an example, the pixel array 1100 of the multi-spectral image sensor 1000 includes a plurality of two-dimensionally arranged pixels, and each pixel may include, for example, 16 sub-pixels arranged in a 4×4 array form.

In FIG. 4, the sub-pixels s1, s2, . . . , s15 respectively sense light in regions having different central wavelengths, and the sub-pixel s16 may correspond to a white channel. Reference numerals 1, 2, . . . , 15 above each spectral sensitivity graph of FIG. 5 represent the sub-pixels s1, s2, . . . , s15 of FIG. 4, respectively.

As may be seen from the spectral sensitivity graph of FIG. 5, the multi-spectral image sensor 1000 may sense light in regions having different central wavelengths for each spectrum by configuring each pixel of the pixel array 1100 to include a plurality of sub-pixels arranged in an n×n (n is an integer greater than or equal to 3) array form.

Because the multi-spectral image sensor 1000 is capable of multi-spectral sensing, it is possible to simultaneously acquire an image and a spectrum.

A camera may be configured to change an image signal of an object measured by such a multi-spectral image sensor to a color of the object to be recognized by human eyes by using a camera characteristic.

The camera characteristic refers to a characteristic related to a conversion relationship between an XYZ tristimulus value of an original object and an RGB output signal of an image acquisition device.

The present disclosure relates to an image processing apparatus for deriving color response characteristics of an image acquisition device. The image processing apparatus may be implemented as a hardware component, a software component, and/or a combination of the hardware component and the software component. For example, the image processing apparatus according to example embodiments may be implemented using one or more general-purpose computers or special-purpose computers, such as a processor, an arithmetic logic unit (ALU), application specific integrated circuits (ASICs), digital signal processors (DSPs), digital signal processing devices (DSPDs), programmable logic devices (PLDs), microcomputers, microprocessors, or any other device capable of executing and responding to instructions.

Software may include a computer program, a code, instructions, or a combination of two or more of these, and may configure an image processing apparatus to be operated as desired or independently or collectively instruct the image processing apparatus to operate.

Software may be implemented as a computer program including instructions stored in a computer-readable storage medium. Examples of the computer readable recording medium include magnetic storage media (e.g., read-only memory (ROM), random-access memory (RAM), floppy disks, hard disks, etc.) and optical recording media (e.g., CD-ROMs, Digital Versatile Discs (DVDs), etc.). The computer readable recording medium may also be distributed over network coupled computer systems so that the computer readable code is stored and executed in a distributed fashion. The media may be read by a computer, stored in a memory, and executed by the processor.

The computer is a device capable of calling a stored instruction from a storage medium and operating according to the called instruction according to the example embodiments, and may include the image processing apparatus according to the example embodiments.

The computer-readable storage medium may be provided in the form of a non-transitory storage medium. Here, 'non-transitory' denotes that the storage medium does not include a signal and is tangible, and does not distinguish that data is semi-permanently or temporarily stored in the storage medium.

The method according to the embodiments to be described later may be provided by being included in a computer program product. The computer program products may be traded between sellers and buyers as commodities.

The computer program product may include a software program and a computer-readable storage medium in which the software program is stored. For example, the computer program product may include a product (e.g., a downloadable application) in the form of a software program distributed electronically through a manufacturer of the image processing apparatus or an electronic market (e.g., Google Play Store™ or App Store™). For electronic distribution, at least a portion of the software program may be stored in a storage medium or may be temporarily generated. The storage medium may be a server of a manufacturer, a server of an electronic market, or a storage medium of a relay server that temporarily stores a software program.

The computer program product, in a system including a server and a terminal (e.g., an image processing apparatus), may include a storage medium of the server or a storage medium of the terminal. Alternatively, when there is a third device (e.g., a smart phone) that is communicatively connected to the server or terminal, the computer program product may include a storage medium of the third device. Alternatively, the computer program product may include a software program transmitted from the server to the terminal or the third device, or transmitted from the third device to the terminal.

The method according to the example embodiments may be performed by executing the computer program product by one of the server, the terminal, and the third device. Alternatively, the method according to the example embodiments may be distributed and implemented by executing the computer program product by two or more of the server, the terminal, and the third device.

For example, a server (e.g., a cloud server or an artificial intelligence server) may control a terminal communicatively connected to the server to perform the method according to the example embodiment by executing the computer program product stored in the server.

As another example, the third device may execute the computer program product to control a terminal communicatively connected to the third device to perform the method according to the example embodiment.

When the third device executes the computer program product, the third device may download the computer program product from the server and execute the downloaded computer program product. Alternatively, the third device may execute the computer program product provided in a preloaded state to perform the method according to the example embodiments.

Figure 6:
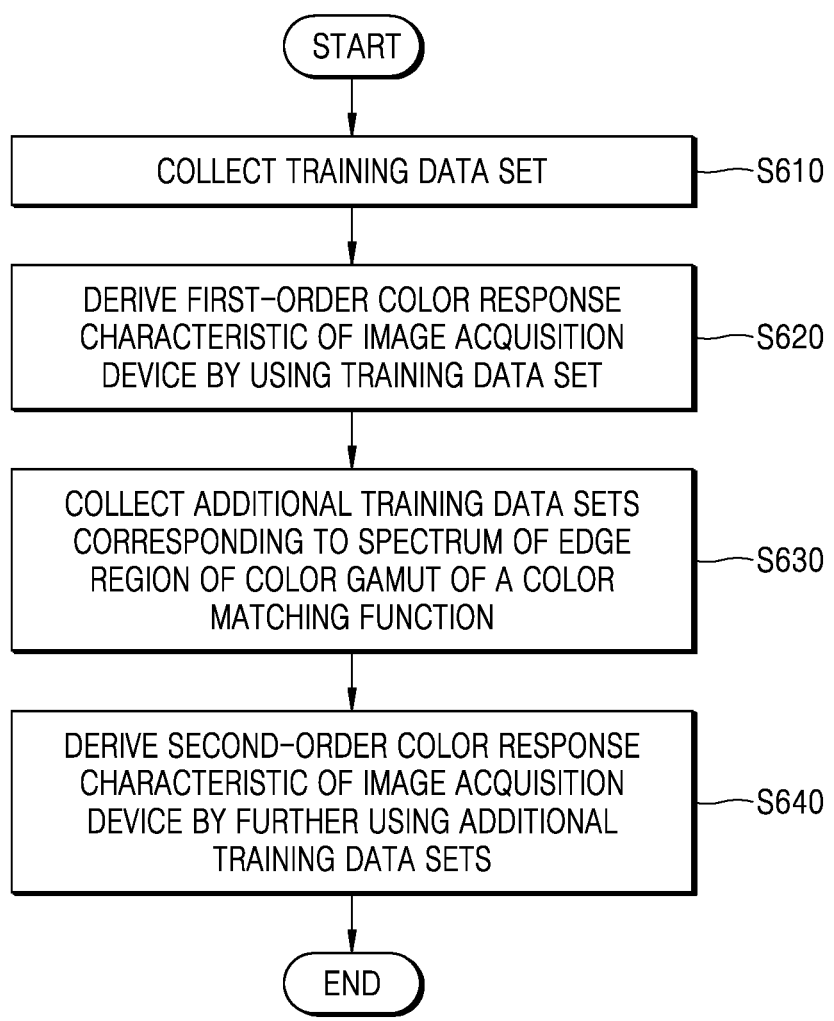
FIG. 6 is a flowchart of a method of deriving color response characteristics of an image acquisition device according to an example embodiment.
Figure 7:
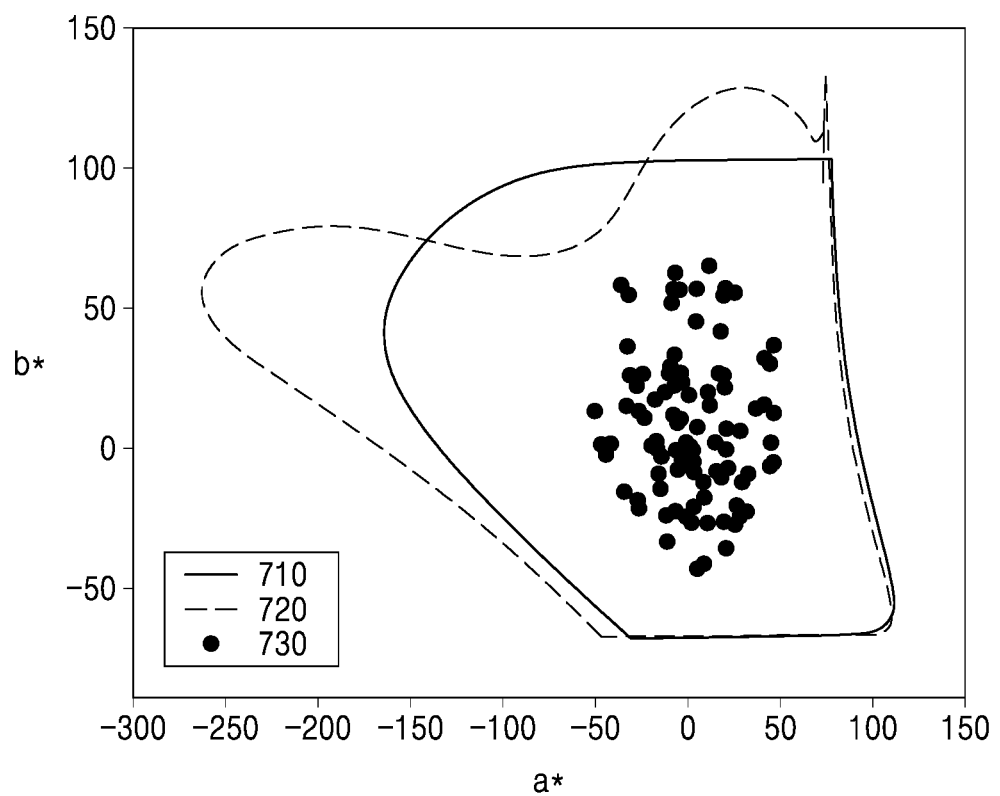
FIG. 7 is a diagram illustrating a*b* chromaticity in which a color gamut corresponding to a first-order color response characteristic and a color gamut of a color matching function are overlapped.
Figure 8:
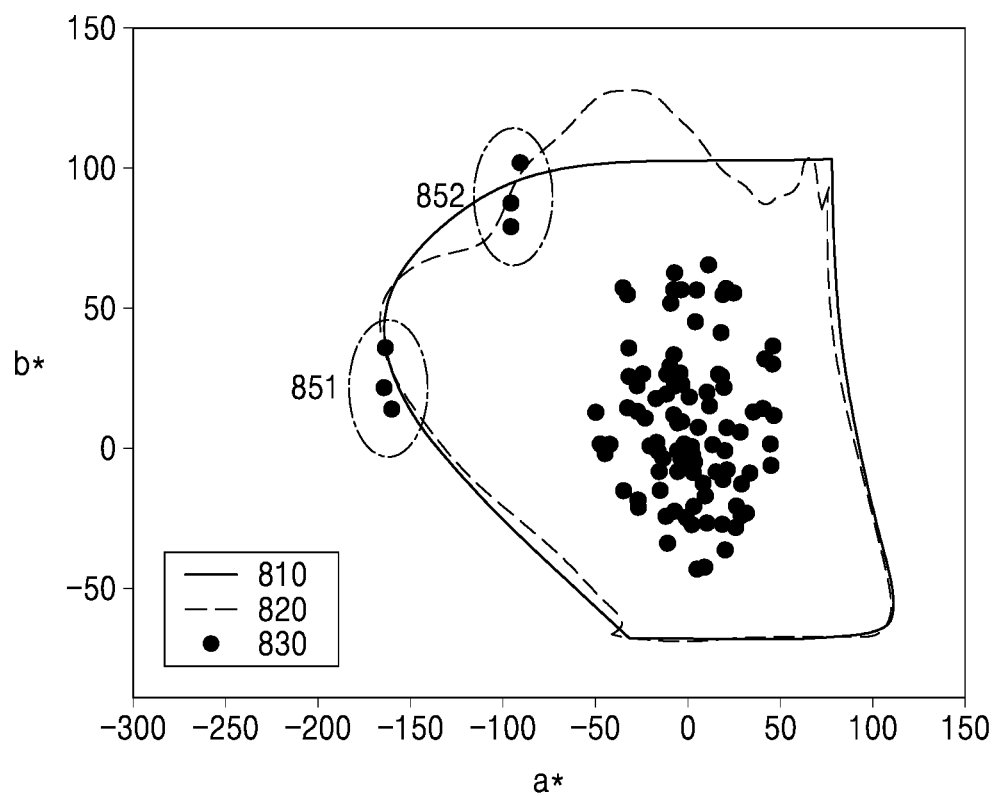
FIG. 8 is a diagram illustrating a*b* chromaticity in which a color gamut corresponding to a second-order color response characteristic and a color gamut of a color matching function are overlapped.

FIG. 6 is a flowchart of a method of deriving color response characteristics of an image acquisition device according to an example embodiment. FIG. 7 is a diagram illustrating a color gamut corresponding to a first-order color response characteristic and a color gamut of a color matching function overlapping an a*b* chromaticity diagram. FIG. 8 is a diagram illustrating a color gamut corresponding to a second-order color response characteristic and a color gamut of a color matching function overlapping an a*b* chromaticity diagram.

A method of deriving color response characteristics of an image acquisition device according to an embodiment will be described with reference to FIGS. 6 to 8.

The method of deriving color response characteristics of an image acquisition device according to an example embodiment includes a method using empirical modeling. According to an example embodiment, the method may derive color response characteristics of an image acquisition device by statistically matching a relationship between device coordinates of the image acquisition device and colorimetric coordinates. Specifically, the method may obtain a transformation matrix between XYZ 3 stimulus values of a sample color and an RGB signal that is output by capturing the sample color with an image acquisition device. In general, it is known that a second-order nonlinear polynomial modeling that obtains color response characteristics by applying a polynomial regression method using 60 or more test colors is effective.

Operation 610 is an operation of collecting training data sets. Training data sets are collected by using spectral data, an exact color value of which is known. Specifically, the training data sets each includes tristimulus values XYZ of an arbitrary test color and an output signal RGB of an image acquisition device that captured the test color.

Operation 620 is an operation of deriving a first-order color response characteristic of the image acquisition device by using training data sets. That is, it is an operation of statistically estimating a relationship between device coordinates and colorimetric coordinates of the image acquisition device by using the training data sets. A color gamut corresponding to the first-order color response characteristic and a color gamut of a color matching function are displayed on the a*b* chromaticity diagram as shown in FIG. 7.

In FIG. 7, reference numeral 710 denotes a color gamut of a color matching function indicating the sensitivity of the human eye, reference numeral 720 denotes a color gamut corresponding to a first-order color response characteristic, and reference numeral 730 indicates a spectrum corresponding to training data. The color gamut refers to a range of all colors that a device may express. As shown in FIG. 7, because the color gamut 710 of a color matching function and the color gamut 720 corresponding to the first-order color response characteristic have different sizes and shapes, color mismatch occurs. That is, because the color output by the image acquisition device does not match the sensitivity of the human eye, the color representation accuracy of the image acquisition device decreases. This problem may arise because the spectrum corresponding to the training data is limited. That is, as shown in FIG. 7, the spectrum corresponding to the central region of the color gamut corresponds to the training data, and the spectrum included in an edge region of the color gamut is not included in the training data. In order to increase the color representation accuracy of the image acquisition device, the range of the spectrum used for the training data may need to be further expanded.

Operation 630 is an operation of further collecting additional training data sets to further expand the range of the spectrum of the training data. The additional training data set may correspond to the edge region of the color gamut of a color matching function representing the sensitivity of the human eye. The color response characteristics of the image acquisition device are calculated by a statistical method. For the efficiency of the response characteristic derivation, it is not possible to expand the additional training data sets indefinitely. To minimize the number of additional training data sets while increasing the color representation accuracy of all image acquisition devices corresponding to the edge region of the color gamut of a color matching function, it is desirable to collect additional training data sets by using a spectrum included in a portion where a difference between a color gamut corresponding to the first-order color response characteristic and a color gamut of a color matching function is large. Specifically, it is desirable that the additional training be limited to a region in which the difference exceeds a preset reference value by comparing the color gamut corresponding to the first-order color response characteristic and the color gamut of a color matching function in a color space. The color space for comparing the color gamut corresponding to the first-order color response characteristic and the color gamut of a color matching function may be a uniform color space, for example, a CIELAB color space.

Operation 640 is an operation of deriving a second-order color response characteristic of the image acquisition device by further using the additional training data sets.

In FIG. 8, reference numeral 810 denotes a color gamut of a color matching function indicating the sensitivity of the human eye, reference numeral 820 denotes a color gamut corresponding to the second-order color response characteristic, and reference numeral 830 denotes a spectrum corresponding to the training data used in deriving the first-order color response characteristic. Reference numerals 852 and 851 denote a spectrum of a portion having a large difference in color gamut between the first-order color response characteristic and the color matching function in FIG. 7, and spectra corresponding to additional training data sets. FIG. 8 shows a case where the color response characteristics of the image acquisition device is derived by using the additional training data sets as well as the initial training data sets, and thus, it may be seen that the difference from the color gamut of the color matching function is small compared to the color response characteristics shown in FIG. 7.

It should be understood that example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A method of deriving color response characteristics of an image acquisition device, the method comprising:
    collecting first training data sets;
    deriving a first-order color response characteristic of the image acquisition device by performing a matching operation of statistically matching a relationship between device coordinates and colorimetric coordinates of an image acquisition device using the first training data sets;
    collecting second training data sets corresponding to a spectrum of one or more edge regions of a color gamut of a color matching function representing a sensitivity of a human eye; and
    deriving a second-order color response characteristic of the image acquisition device by further performing the matching operation using the second training data sets,
    wherein the second-order color response characteristic corresponds to a conversion relationship between an XYZ tristimulus value and an RGB output signal of the image acquisition device.

2. The method of claim 1, wherein the collecting of the second training data sets further includes comparing the color gamut corresponding to the first-order color response characteristic with the color gamut of the color matching function in a color space and collecting the second training data sets based on a result of the comparing.

3. The method of claim 2, wherein the second training data sets correspond to a spectrum included in a region in which a difference between the color gamut corresponding to the first-order color response characteristic and the color gamut of the color matching function exceeds a preset reference value among the one or more edge regions.

4. The method of claim 2, wherein the color space is a CIELAB color space.

5. The method of claim 2, wherein the comparing includes comparing the color gamut corresponding to the first-order color response characteristic with the color gamut of the color matching function in an a*b* chromaticity diagram.

6. The method of claim 1, wherein the first-order color response characteristic corresponds to the conversion relationship between the XYZ tristimulus value and the RGB output signal of the image acquisition device.

7. The method of claim 6, further comprising:
    converting an image signal obtained by the image acquisition device to a color determined by using the conversion relationship corresponding to the first-order color response characteristic or the second-order color response characteristic.

8. The method of claim 7, further comprising:
    outputting the converted image signal to be displayed on a display of the image acquisition device.

9. The method of claim 1, wherein the image acquisition device includes a multi-spectral image sensor, the multi-spectral image sensor including a plurality of pixels that are two-dimensionally arranged, each pixel of the plurality of pixels including sub-pixels, and
    wherein the color matching function used in the collecting of the second training data sets is based on a spectral sensitivity according to a wavelength of each sub-pixel.

10. An image acquisition device comprising:
    a multi-spectral image sensor including a plurality of pixels that are two-dimensionally arranged, the multi-spectral image sensor configured to acquire an image using the plurality of pixels; and
    a processor configured to:
    derive a first-order color response characteristic of the image acquisition device by performing a matching operation of statistically matching a relationship between device coordinates and colorimetric coordinates of an image acquisition device using first training data sets;
    derive a second-order color response characteristic of the image acquisition device by further performing the matching operation using second training data sets, the second training data sets corresponding to a spectrum of one or more edge regions of a color gamut of a color matching function representing a sensitivity of a human eye; and
    process the image acquired by the multi-spectral image sensor by using the first-order color response characteristic and the second-order color response characteristic,
    wherein the second-order color response characteristic corresponds to a conversion relationship between an XYZ tristimulus value and an RGB output signal of the image acquisition device.

11. The image acquisition device of claim 10, wherein the processor is further configured to collect the second training data sets based on a result of comparing the color gamut corresponding to the first-order color response characteristic with the color gamut of the color matching function in a color space.

12. The image acquisition device of claim 11, wherein the second training data sets correspond to a spectrum included in a region in which a difference between the color gamut corresponding to the first-order color response characteristic and the color gamut of the color matching function exceeds a preset reference value among the one or more edge regions.

13. The image acquisition device of claim 11, wherein the color space is a CIELAB color space.

14. The image acquisition device of claim 11, wherein the processor is further configured to compare the color gamut corresponding to the first-order color response characteristic with the color gamut of the color matching function in an a*b* chromaticity diagram.

15. The image acquisition device of claim 10, wherein the first-order color response characteristic corresponds to the conversion relationship between the XYZ tristimulus value and the RGB output signal of the image acquisition device.

16. The image acquisition device of claim 15, wherein the processor is further configured to convert an image signal obtained by the image acquisition device to a color determined by using the conversion relationship corresponding to the first-order color response characteristic or the second-order color response characteristic.

17. The image acquisition device of claim 16, wherein the processor is further configured to output the converted image signal to be displayed on a display of the image acquisition device.

18. The image acquisition device of claim 10, wherein the color matching function used in the collecting of the second training data sets is based on a spectral sensitivity according to a wavelength of each sub-pixel.

19. A non-transitory recording medium comprising a computer readable program in which a program for implementing a method of operation performed by an electronic device is recorded, the method comprising:
   collecting first training data sets;
   deriving a first-order color response characteristic of an image acquisition device by performing a matching operation of statistically matching a relationship between device coordinates and colorimetric coordinates of the image acquisition device using the first training data sets;
   collecting second training data sets corresponding to a spectrum of one or more edge regions of a color gamut of a color matching function representing a sensitivity of a human eye; and
   deriving a second-order color response characteristic of the image acquisition device by further performing the matching operation using the second training data sets,
   wherein the second-order color response characteristic corresponds to a conversion relationship between an XYZ 3 stimulus value and an RGB output signal of the image acquisition device.

* * * * *